(12) United States Patent
Wakuta et al.

(10) Patent No.: US 6,258,001 B1
(45) Date of Patent: Jul. 10, 2001

(54) VEHICLE DRIVE TRAIN

(75) Inventors: Satoru Wakuta; Keiichi Shinohara; Masahiro Hasebe; Shigeo Tsuzuki; Kenji Omote, all of Anjo; Atsushi Tabata, Toyota; Yutaka Taga, Toyota; Seiji Nakamura, Toyota; Masaya Amano, Toyota, all of (JP)

(73) Assignees: Aisin AW Co., Ltd.; Toyota Jidosha Kabushiki Kaisha, both of (JP)

( * ) Notice: Subject to any disclaimer, the term of this patent is extended or adjusted under 35 U.S.C. 154(b) by 0 days.

(21) Appl. No.: 09/461,802

(22) Filed: Dec. 16, 1999

(30) Foreign Application Priority Data

Mar. 26, 1999 (JP) .................................. 11-084924
Apr. 12, 1999 (JP) .................................. 11-104540

(51) Int. Cl.$^7$ .............................. F16H 3/72; F16D 33/00
(52) U.S. Cl. ............................... 475/5; 192/3.28
(58) Field of Search .............................. 475/5; 192/3.28, 192/3.32, 3.33, 3.31

(56) References Cited

U.S. PATENT DOCUMENTS

| 4,346,773 | * | 8/1982 | Hofbauer et al. | 180/165 |
| 4,836,362 | * | 6/1989 | Bower | 192/3.33 X |
| 4,860,861 | * | 8/1989 | Gooch et al. | 192/3.28 X |
| 4,958,095 | * | 9/1990 | Uchida et al. | 310/59 |
| 5,103,127 | * | 4/1992 | Peter | 192/3.31 X |
| 5,285,111 | * | 2/1994 | Sherman | 180/65.2 X |
| 5,361,880 | * | 11/1994 | Bojas | 192/3.33 X |
| 5,482,512 | * | 1/1996 | Stevenson | 475/5 |
| 5,755,302 | * | 5/1998 | Lutz et al. | 180/65.2 |
| 5,773,904 | * | 6/1998 | Schiebold et al. | 310/92 |
| 5,789,823 | | 8/1998 | Sherman | 290/47 |
| 6,041,901 | * | 3/2000 | Werner et al. | 192/3.28 |
| 6,092,985 | * | 7/2000 | Winkam | 415/124.1 |

FOREIGN PATENT DOCUMENTS

| 259268 | * | 10/1988 | (JP) | 192/3.28 |
| 524447 | | 2/1993 | (JP) . | |
| 530605 | | 2/1993 | (JP) . | |
| 9215270 | | 8/1997 | (JP) . | |
| 1044789 | | 2/1998 | (JP) . | |

\* cited by examiner

*Primary Examiner*—Charles A Marmor
*Assistant Examiner*—Ha Ho
(74) *Attorney, Agent, or Firm*—Lorusso & Loud

(57) ABSTRACT

The present invention improves mountability of a drive train in a hybrid vehicle by minimizing axial and radial dimensions while providing for adequate output torque of the motor/generator of the drive train. A center portion of a front cover of a torque converter extends axially and a multiple disc lock-up clutch is arranged at the inner circumferential surface of the center portion while the motor/generator is arranged at the outer circumferential surface of the center portion. A spring damper is provided at the radially inner side of a circumferential surface defined by friction plates of the lock-up clutch.

25 Claims, 4 Drawing Sheets

VEHICLE DRIVE TRAIN

DETAILED DESCRIPTION OF THE INVENTION

1. Field of the Invention

The present invention relates to a drive train connecting an engine and a motor in a vehicle, and more specifically to a hybrid vehicle drive train having a motor integrated with an automatic transmission, including a hydraulic transmission such as a torque converter, into a single unit.

2. Related Art

Japanese Patent Application No. HEI 9-215270, Japanese Patent Application No. HEI 5-30605 and Japanese Patent Application No. HEI 5-024447 all disclose parallel type hybrid vehicle drive trains. This type of hybrid vehicle drive train is provided with a motor/generator in an automatic transmission having a torque converter. The driving force of the motor/generator during start and acceleration of the vehicle assists the driving force of the engine. The motor/generator also functions as a generator to assist the engine brake effect when driving down a hill and also regenerates braking energy, thereby improving gas mileage and reducing the amount of discharged exhaust gas.

In the drive train disclosed by HEI 9-215270, a motor housing which houses a motor/generator is interposed between an engine housing and a transmission housing which also houses a torque converter. In the drive train disclosed by HEI 5-30605, a motor/generator is provided between a pump impeller and a turbine runner of the torque converter. In the drive train disclosed by HEI 5-024447, a motor/generator is provided between an element extending from the torque converter to the output shaft via an automatic transmission unit and a case which houses the drive system. More specifically, the motor/generator is provided between the torque converter and the automatic transmission unit or on the side behind the transmission.

When the motor/generator is provided between an internal combustion engine and a torque converter, as in HEI 9-215270, the overall length of the unit including the transmission and the engine increases by the axial length of the motor/generator, creating a problem of mounting in a vehicle. Decreasing the axial length of the motor/generator in order to limit the overall length is a possibility; however, since the output torque of the motor (generator) is defined by the length of the rotor and the stator, it is difficult to shorten the overall length while maintaining the required output torque of the motor. Also, when the rotor is directly connected to the crankshaft, the precision of centering of the crankshaft directly affects the precision of centering of the rotor. Therefore, with the rotor it is necessary to set an air gap sufficient only to allow for the amount of eccentricity following the vibrations deriving from combustion. As a result, the efficiency of the motor/generator decreases requiring a proportional increase in capacity (size) of the motor/generator.

When a motor/generator is arranged axially intermediate a front cover of a torque converter and a turbine, as in HEI 5-30605, the axial length increases by the length of the motor/generator just as mentioned above. Furthermore, the precision of centering of the crankshaft directly affects the precision of support of the rotor because the front cover is directly connected to the crankshaft. In addition, the stator which is fixed to the pump impeller and the rotor which is fixed to the turbine runner shift relative to one another in the axial direction due to expansion or contraction of the torque converter from changes in the charge pressure and centrifugal pressure thereof, resulting in an equivalent drop in efficiency of the motor. Therefore, a larger motor/generator is needed in order to achieve the required output to compensate for the efficiency drop. In addition, when aligned radially with a torque converter, the motor/generator extends beyond the outer diameter of the torque converter. This results in an increase in the overall radial dimension which makes it difficult to ensure minimum freeboard and complicates mounting in a vehicle. In this case, ensuring the output torque of the motor (generator) is relatively easy since the diameter of the motor/generator is greatly increased. However, since the diameter of the torque converter is fixed according to the output torque of the engine, the diameter of the motor/generator arranged radially outward of the torque converter cannot be made smaller.

Further, in the design of HEI 5-024447 it is difficult to increase the diameter of the motor/generator, and therefore difficult to ensure the output torque of the motor (generator) within a limited space, i.e. the space between the torque converter and the automatic transmission or on the side behind the automatic transmission. In addition, since the motor/generator is connected to the engine via the torque converter or further, via the automatic transmission unit it is difficult to start the engine by the motor/generator, and therefore, an additional motor for starting the engine becomes necessary.

SUMMARY OF THE INVENTION

Accordingly, one object of the present invention is to provide a vehicle drive unit which allows for smaller axial and radial dimensions. A second object of the present invention is to provide a hybrid vehicle drive train which supports the motor with high precision independent of centering precision of the engine crankshaft and independent of deformation of the hydraulic transmission. A third object is to increase the efficiency of the motor and enable the motor to be made smaller.

To achieve the foregoing objects, the present invention provides a vehicle drive train including an engine, a first transmission unit and a second transmission interposed between a crankshaft of the engine and an input shaft of the first transmission unit. The hybrid vehicle drive train also includes a lock-up clutch and a motor having a stator and a rotor, wherein the rotor is directly connected to an output element of the engine for rotation therewith in forward and reverse directions. The hybrid vehicle drive train has the lock-up clutch located between the engine and the second transmission unit. The lock-up clutch has a diameter smaller than the outer diameter of the second transmission unit and the motor is arranged axially overlapping and radially outward of the outer circumference of the lock-up clutch. By such a design, the invention ensures mountability in a vehicle. In addition, capacity of the second transmission is ensured because the motor is arranged radially outward of the lock-up clutch and between the engine and the second transmission. Furthermore, the motor is arranged so as to ensure mounting capability with adequate freeboard. Output torque of the motor is ensured and starting performance of the engine and drive performance of the vehicle are improved.

Preferably, the lock-up clutch is a multiple disc clutch. Because the lock-up clutch is a multiple disc clutch it provides sufficient torque capacity, despite the fact that it has a small diameter, so that the motor can be arranged on the outer diameter side of the lock-up clutch, i.e., radially outward of the lock-up clutch.

The lock-up clutch is preferably connected to a damper having coil springs spaced around its circumference. This damper is arranged axially overlapping on the inner circumference of the friction plates of the lock-up clutch. Since the damper does not require its own axial space, the overall length of the drive train need not be increased to accommodate same.

The second transmission unit is preferably a hydraulic transmission, for example a torque converter which includes a turbine runner, a pump impeller, and a stator, and which increases torque when starting the vehicle in motion under power of the motor only. The hydraulic transmission may have a front cover which covers the turbine runner and the lock-up clutch and which connects the pump impeller, the crankshaft, and the rotor of the motor. The front cover has an axially extending portion in the center thereof, which defines a small diameter portion of the housing of the second transmission unit. The motor is arranged radially outward of this small diameter portion, with its rotor axially overlapping the small diameter portion, i.e., facing an outer circumferential surface of the axially extending portion of the front cover. The lock-up clutch axially overlaps the axially extending portion of the front cover and is radially inward thereof. The front cover compartmentalizes the motor so that the motor is separated from the oil of the hydraulic transmission. Otherwise, the efficiency of the motor would drop due to the churning of the oil.

A sensor is preferably provided for the purpose of detecting the rotational position of the rotor. This sensor is arranged in a position substantially axially aligned with the lock-up clutch and radially inward of the motor stator. By detecting the rotational position of the rotor the sensor enables efficiency of the motor to be improved. It also reliably prevents reverse rotation during starting. Moreover, the overall length of the unit is minimized because no special axial space is needed for the sensor.

Preferably, the motor is housed in a motor housing, the stator is fixed in this motor housing and the rotor of the motor is rotatably supported thereby. The motor housing is arranged axially intermediate a housing for the second transmission unit and a housing for the engine. Therefore, sub-assembly of the motor, including the motor housing, is made possible. Such an arrangement facilitates production without drastically changing the conventional production line and is flexible in adaptation to many engine and vehicle variations.

The rotor is preferably directly connected to the front cover so that there is no need for a space dedicated to rotor support, thereby making it possible to decrease the axial dimension.

Preferably, the motor is a motor/generator 6 which also functions as a generator. Operating in its motor mode, the motor/generator which is directly connected to the crankshaft of the engine, drives the vehicle either alone or by assisting the internal combustion engine. In addition, as a generator, the motor/generator increases the engine brake effect and functions as a regenerative brake. Moreover, as a starter motor, the motor/generator starts the internal combustion engine. This combination of three different functions into one electrical machine eliminates the need for a special starter motor and makes it possible to eliminate idling of the engine. Further, this arrangement, in addition to providing the vehicle drive function and regenerative brake function, makes it possible to further decrease fuel consumption and reduce exhaust gas.

As previously noted, it is preferred that the stator is fixed to the motor housing and that the rotor is rotatably supported thereby and the motor is arranged and supported independently therein as well. Therefore, the motor is supported with high precision, particularly with respect to centering precision which is not affected by eccentric rotation of the crankshaft. A gap (air gap) is maintained with high precision between the rotor and the stator and the efficiency of the motor is improved. Each of the above-mentioned features are reliably achieved with relative compactness.

Supporting members for support of the motor rotor may be provided separately from the front cover on the engine side thereof, with a bearing interposed between these supporting members to allow for relative rotation therebetween. Because the rotor is supported by supporting members provided separately from the front cover, the rotor is isolated from influence of deformation of the second transmission unit due to changes in pressure within the second transmission unit. Further, the axial dimension (thickness) of the rotor may be increased without increasing the dimensions of the motor, while ensuring the required performance of the motor. The motor housing may have a side wall which separates the engine from the motor with the bearing at the inner circumference of the side wall and with the supporting members which support the motor rotor being connected to the front cover. Accordingly, the engine side of the motor is covered by the side wall which protects it from water and dust. In addition to functioning as a cover, this side wall also functions as a rotor support, which allows for a more compact construction.

In preferred embodiments wherein the second transmission unit is a torque converter, the front cover may be integrally connected to the outer shell of the pump impeller and cover the turbine runner. A center shaft is integrally connected to the front cover, which center shaft is axially aligned with the crankshaft of the engine with a gap therebetween. The center shaft and the crankshaft may be connected via impact cushioning members. Because the center shaft and the crankshaft are separated by a gap therebetween and are connected with impact cushioning members, combustion (explosion) vibrations of the engine are absorbed by the impact cushioning members and are thereby prevented from being transmitted to the rotor of the motor, thus assuring precision in the support of the rotor. In addition, the radial load on the bearing is reduced which reduces its wear.

In a preferred embodiment to be described later herein, a plate hub is connected to the crankshaft via the impact cushioning members and is spline-coupled to the center shaft. This spline-couple is a press-fit (without any "play") created by the engagement between splines with a lead (helical) and straight toothed splines. Because there is no play in the splined coupling fretting wear is prevented.

Further, in a preferred embodiment a hub of a support member which supports the motor rotor is fitted on the center shaft. The hub of the support member is tightened with a nut which screws onto screw threads formed on the center shaft so as to be pressed against and connected to a flange portion of the center shaft. As a result, fretting wear due to looseness of the splined connection or the like is prevented and exposure of the motor/generator to rust particles and the like is reliably prevented.

The impact cushioning members interposed between the engine crankshaft and the center shaft may be two flexible plates whereby the explosive vibrations of the engine are absorbed by the flexing of the two plates such that the torque of the engine crankshaft is reliably transmitted to the center shaft, the precision of centering the rotor is ensured, and the durability of the bearing is improved.

As previously noted, in the preferred embodiments the hydraulic transmission is a torque converter having a turbine runner, a pump impeller and a stator, and the motor is a motor/generator which functions both in a motor mode and in a generator mode. Accordingly, in the preferred embodiments, operating as a motor, the motor/generator may drive the vehicle either alone or by assisting the internal combustion engine. In addition, operating as a generator, the motor/generator increases the engine brake effect and functions as a regenerative brake. Moreover, as a starter motor, the motor/generator starts the internal combustion engine. This combination of functions into a single electrical/mechanical machine eliminates the need for a special starter motor and makes it possible to eliminate idling of the engine, in addition to providing the vehicle drive function and the regenerative brake function, making it possible to further decrease fuel consumption and reduce exhaust gas.

DESCRIPTION OF THE PREFERRED EMBODIMENT

Figure 1:
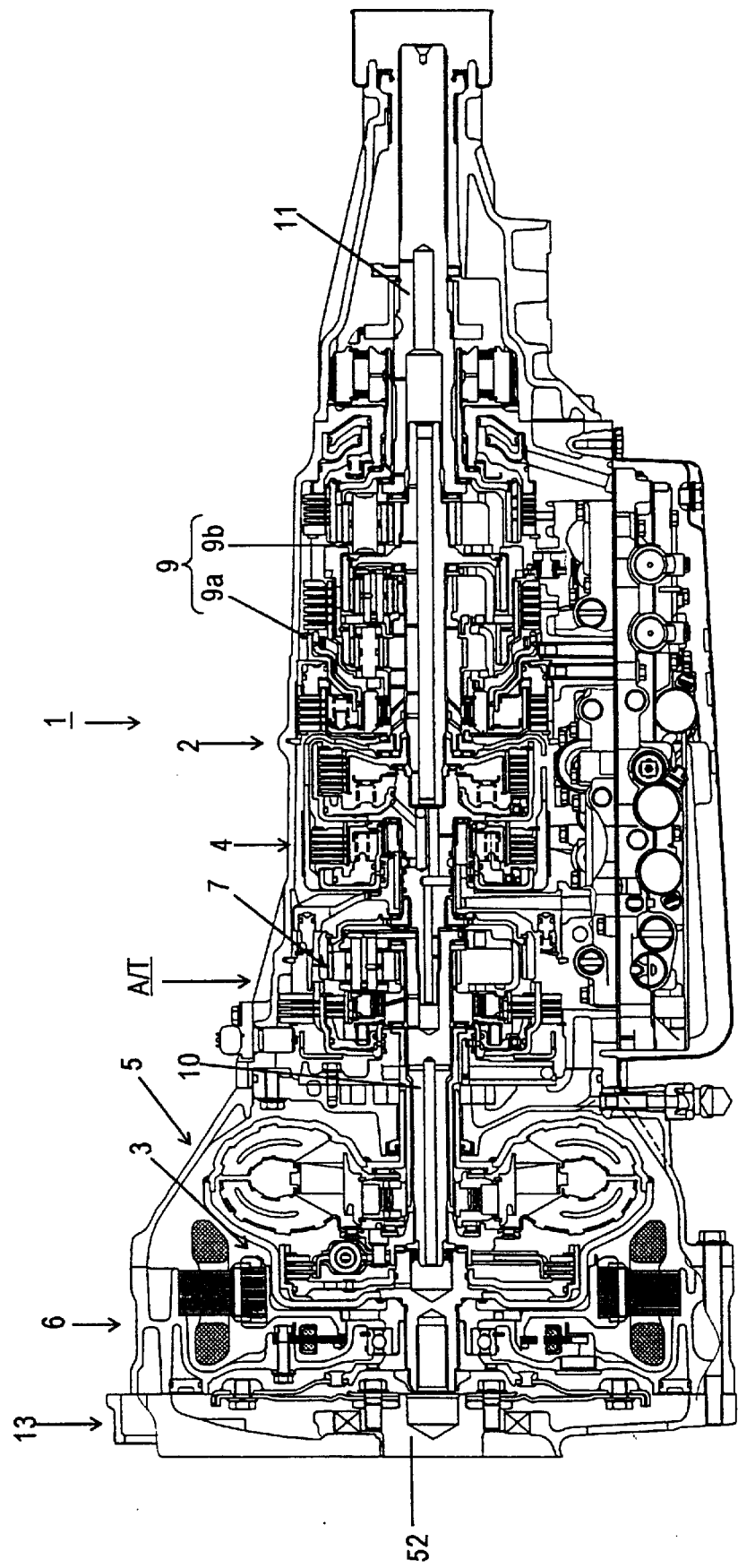
FIG. 1 is a cross-sectional view of an embodiment of a hybrid vehicle drive train according to the present invention.

FIG. 1 is a cross-sectional view of a hybrid vehicle drive train according to one embodiment of the present invention. As shown in FIG. 1, the hybrid vehicle drive train 1 includes a multi-stage transmission unit 2 housed in a transmission case 4, a torque converter 5 having a lock-up clutch 3, and a motor/generator 6, e.g., a brushless DC motor or the like, which is connected to an internal combustion engine 13, e.g., a gasoline engine, at the left side in the drawing. That is, the hybrid vehicle drive train 1 is a hybrid vehicle drive train having a motor/generator 6 which is connected to a torque converter 5 of a conventional automatic transmission A/T.

The hybrid vehicle drive train 1 is arranged uniaxially for mounting in a front engine/rear drive (FR) type vehicle. Specifically, the motor/generator 6, the torque converter 5 and the automatic transmission unit 2 are sequentially arranged uniaxially (in line) from the engine side. The automatic transmission unit 2 is provided with an over-drive section 7 and is composed of a main gearbox 9 including a Simpson type planetary gear unit 9a and one simple planetary gear 9b. The rotation of the input shaft 10 is output as one of five forward speeds and one reverse speed, at output shaft 11.

Figure 2:
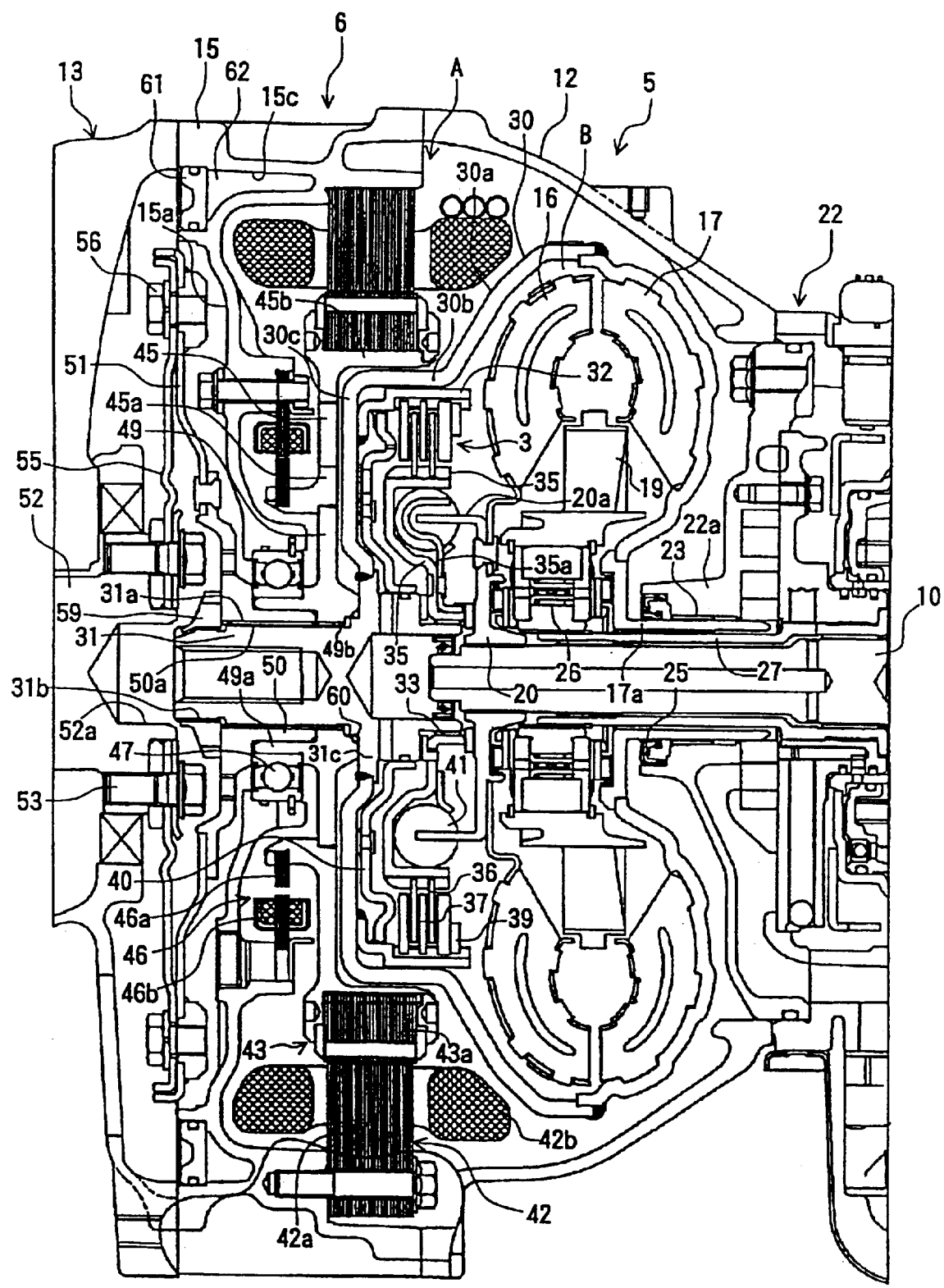
FIG. 2 is a cross-sectional view of the torque converter and the motor/generator of the embodiment of FIG. 1.

FIG. 2 shows main portions of the hybrid vehicle drive train 1 including the torque converter 5 and the motor/generator 6. The motor housing 15 is arranged in axial alignment with and interposed between the converter housing 12 and the internal combustion engine 13. The torque converter 5 has a turbine runner 16, a pump impeller 17, and a stator 19. The turbine runner 16 is connected to a hub 20 which is spline-coupled to the front end of the input shaft 10. An oil pump 22 is mounted in a space between the torque converter housing 12 and the transmission case 4 of the automatic transmission unit 2. A pump case 22a is fixed to the housing 12 and the case 4.

A hub 17a fixed to the central portion of the pump impeller 17 is rotatably supported via a needle bearing 23 on the inside perimeter of the pump case 22a and an oil seal 25 is provided between the oil pump case 22a and the hub 17a. A stator 19 is mounted on a one-way clutch 26. The inner cage of this one-way clutch is fixed to the oil pump 22a via a sleeve 27 arranged between the input shaft 10 and the hub 17a.

The outer diameter portion 30a of the front cover 30, which is fixed to the pump impeller 17, is formed inclined and smooth, conforming to the shape of the turbine runner 16 to form a taper portion connecting the largest diameter portion of the outer diameter portion 30a to a center portion 30b of the front cover 30. The center section 30b of the front cover 30 has a smaller diameter than the diameter of the largest diameter portion of the outer diameter portion 30a and extends toward the engine side (forward), substantially parallel to the central axis of the drive train. The inner diameter section 30c of the front cover 30 extends substantially in the radial direction. The inner diameter section 30c of the front cover is fixed to the center shaft 31 which extends in the axial direction aligned with the input shaft 10.

The lock-up clutch 3 is arranged radially inward of the center section 30b and includes: a drum 32 which is fixed to the inner diameter section 30c of the front cover 30 and which is coaxial with the center section 30b; a hub 35 which is supported at the rearward end of the center shaft 31 via a needle bearing 33; and a plurality of inner friction plates 36 and outer friction plates 37 which engage with the splines of the drum 32 or the hub 35, respectively. The outer friction plates 37 are retained between a snap ring 39, which engages the drum 32, and a piston plate 40. The lock-up clutch 3 has a diameter smaller than that of the torus which constitutes the outer shell of the turbine runner 16 and the pump impeller 17 of the torque converter 5. Specifically, the lock-up clutch 3 is a multiple disc clutch and is arranged such that the drum 32 is positioned in substantially the radial center of the torus.

The piston plate 40 extends radially between the drum 32 and the axial member 31 and is axially moveable. Pressure applied by piston plate 40 is used to control connection, release, and slip of the lock-up clutch 3. The piston plate has orifices formed therein so that hydraulic oil can flow between the oil chambers on opposing sides of the piston plate 40 while being throttled. Changing the direction of this oil flow enables lock-up clutch control. Furthermore, a plurality of damper springs 41 (coil springs) are arranged circumferentially spaced around the interior of the hub 35. These damper springs 41 are provided compressed between a lug 35a fixed to the lock-up clutch hub 35 and a lug 20a fixed to the turbine hub 20. That is, the damper springs 41 are positioned substantially radially aligned with and inward of the friction plates 36, 37 of the lock-up clutch 3, i.e., arranged axially overlapping with the friction plates of the lock-up clutch 3.

The motor/generator 6 has a stator 42 and a rotor 43 which are arranged substantially radially aligned with and radially outward of the center section 30b of the front cover 30. That is, the stator and the rotor are positioned to axially overlap the center section 30b and to axially overlap the lock-up clutch 3 which is positioned radially inward of the center section 30b. The damper springs 41 are also located radially inward of the center section 30b. Specifically, the rotor 43 is constructed of multiple laminated plates 43a, each of which is a permanent magnet. These laminated plates are fixed to and supported by a support plate 45. This support plate 45 has a radially extending disc portion 45a forward of the inner diameter section 30a of the front cover and a peripheral retention portion 45b which retains the laminated plates 43a. The retention portion 45b has a front end fixed to the disc portion 45a and extends coaxially with the center section 30b of the front cover.

The rotor 43 is directly connected to the engine crankshaft 52 through hub 49, center shaft 31 (connection between splines 49b and 31a), input plate hub 50 (connection between splines 50a and 31a), and drive plate 55 which is bolted to the crankshaft 52. In this manner the rotor 43 is fixed to the engine crankshaft 52 for rotation therewith in both forward and reverse directions.

The stator 42 is formed of a plurality of magnet cores 42a stacked (laminated) in the axial direction, surrounded by a coil 42b and fixed to the motor housing 15. The rotor 43 and the stator 42 are positioned so that laminated plates 43a and magnet cores 42a are axially coextensive or axially overlapping. That is, they are aligned radially for a predetermined length in the axial direction and the laminated plates and magnet cores oppose each other with a slight gap therebetween. In the motor/generator, the stator 42 is made as large as possible without interfering with mounting in the vehicle to improve polarity and ensure a predetermined output. The inner diameter of the stator 42 and the outer diameter of the rotor 43 are both smaller than the largest diameter portion of the outer diameter portion 30a of the front cover 30. The magnet laminated plates 43a of the rotor 43 must have strength sufficient to withstand centrifugal force.

Also, the motor housing 15 has a side wall 15a which follows the contour of the forward portion of the stator 42. A resolver 46, which is a sensor for detecting the rotational position of the rotor, is provided between the side wall 15a and the rotor support plate 45. The resolver 46 correctly detects the rotational position of the rotor of the brushless DC motor 3 and controls the timing of the current flowing to the stator. This resolver 46 is composed of a rotor 46a and a stationary part 46b, each formed of precision machined laminated plates. The stationary part 46b energized by the coil and the rotor 46a are radially aligned, i.e., axially overlapping. The resolver 46 is arranged to axially overlap the stator coil 42b on the radially inward side thereof and forward of the motor/generator 6 and inner section 30c of the front cover, i.e., substantially axially aligned with the lock-up clutch 3.

A ball bearing 47 is installed at the inner periphery of the motor housing side wall 15a. This ball bearing is arranged in a position substantially radially aligned with and inward of the resolver 46, i.e., in a position axially overlapping the resolver 46. A flange portion 49b of the hub 49 fixed to the inner periphery of the rotor support plate 45 fits with almost no gap, on the inner surface of the ball bearing 47. Further, on the inner diameter side of flange portion 49b is a similarly fitting input plate boss portion 50. A flexible input plate 51 is fixed to this boss portion 50 at the outer periphery thereof. A flexible drive plate 55 is fixed with bolts 53 to the tip of the crankshaft 52 of the engine and is fixed with bolts 56 to flexible input plate 51.

The center shaft 31 opposes the bore 52a at the distal end of the crankshaft 52 but does not extend into bore 52a, i.e., is axially spaced therefrom. As shown in detail in FIG. 3, a spline 31a with a lead having a predetermined angle θ slant (helical) is formed around the periphery of the coaxial member 31. Meanwhile, parallel straight tooth splines 50a are formed extending the entire axial length of the input plate hub 50 on the inner circumferential surface thereof. Also, relatively short, parallel, axially spaced, straight tooth splines 49b are formed on a portion of the rear side of the inner circumferential surface of the rotor hub 49. Thread grooves 31b of a predetermined length are formed at the front end of the center shaft member 31, with a nut 59 tightened on the threads 31b.

Figure 3:
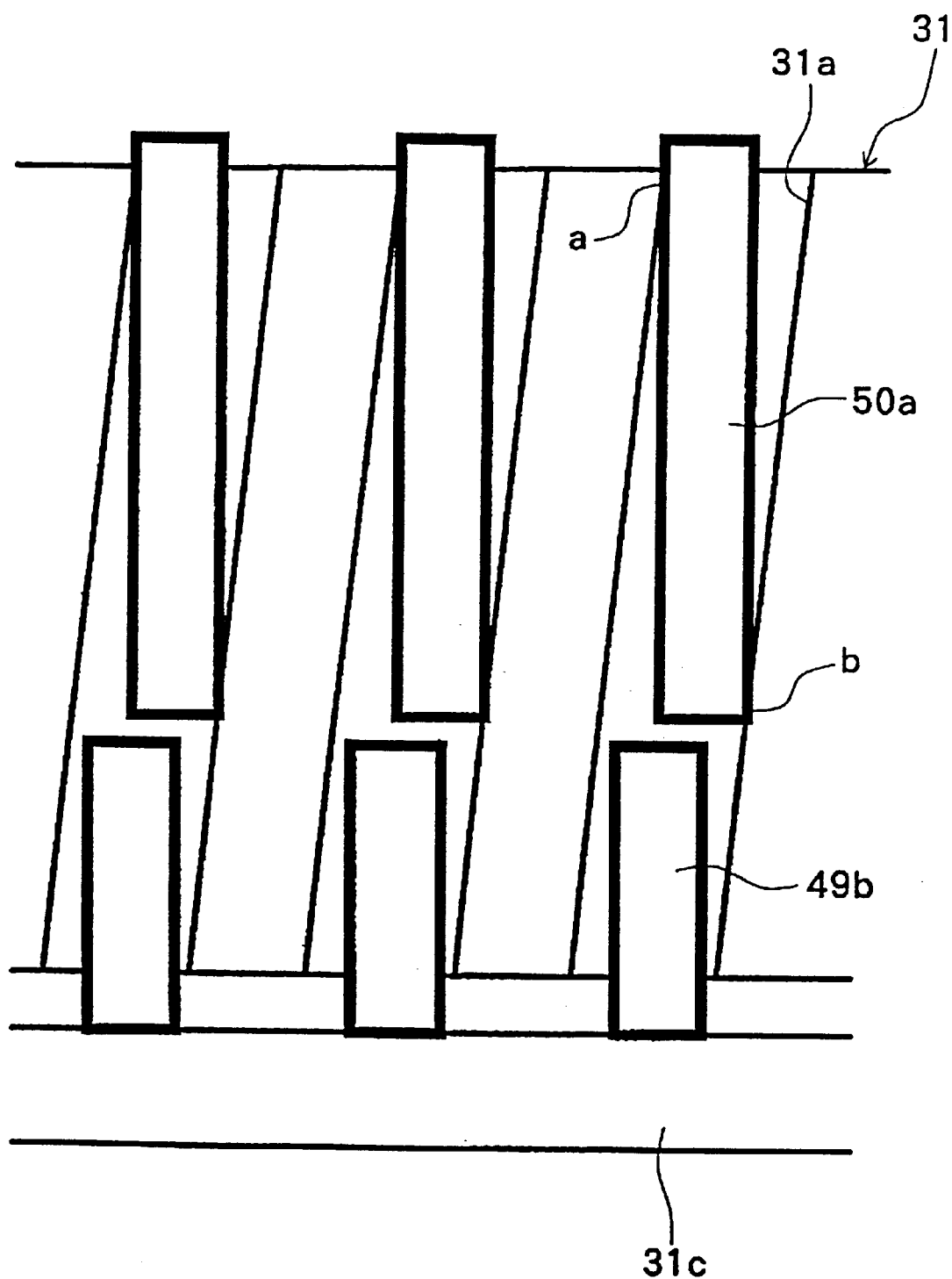
FIG. 3 is an expanded perspective view of the splines of a forward axial member engaged with input plate hub splines and rotor hub splines.

Tightening of the nut 59 serves to engage the splines 49b of the rotor hub 49 and the splines 50a of the input plate hub 50 with the splines 31a on the center shaft 31. As a result, as shown in FIG. 3, the tooth side surfaces a, b at opposing end portions of the straight teeth of the relatively long input plate hub splines 50a are pressed against the tooth side surfaces adjacent to the slanted splines 31a of the center shaft 31. In this press-fit state, splines 50a and 31a couple with no play. Accordingly, splines 50a and 31a integrally rotate preventing wear which would otherwise be caused by gaps between the engaging spline teeth.

The relatively short rotor hub splines 49b (straight teeth) engage the splines 31a with a lead. The fit is loose, with spaces between the side surfaces of the teeth because of the fact that the rotor hub splines 49b are short. As a result, attachment is easily made despite the press-fit of the input plate hub splines 50a. The rotor hub 49 is able to move in the axial direction because of the loose fit of the splines and is thereby held, wedged tightly between the input plate hub 50 and the center piece flange portion 31c by the tightened nut 59. As a result, by frictional force, the rotor hub 49 integrally rotates with the axial member 31 and the input plate hub 50.

The motor compartment A defined by the pump case 22, the front cover 30 which is the case of the torque converter 5, and the outer shell of the pump 17 are made waterproof, oil-proof, and dust-proof by an O-ring 60 which seals the space between the rotor hub 49 and the front cover 30, by the sealed ball bearing 47, and by a seal 25 within the pump case 22a. The motor housing side wall 15a serves as a cover member covering the front of the motor/generator 6, as well as a mounting for the ball bearing 47, and also serves as a support for the rotor 43. Combining both functions improves the compactness of the unit. A circular groove 15c is formed in the motor housing 15, which is sealed water tight by a ring shaped cap member 61, creating a water passage 62 for cooling. Water for cooling the engine is circulated in this water passage 62, to prevent the motor compartment A from over-heating.

As mentioned above, the diameter of the lock-up clutch 3 is reduced, with the motor/generator 6 arranged substantially axially aligned with and radially outward of the lock-up clutch 3. Further, the damper spring 41 is arranged substantially radially aligned with the lock-up clutch 3. Also, because the resolver 46 is arranged radially inward of the coil 42b of the motor generator 6 and is substantially axially aligned with the lock-up clutch 3, the functions of the motor housing side wall 15a as a cover member and as the rotor support member may be combined and the motor/generator 6 may be mounted in the automatic transmission so as to minimize the overall axial and radial dimensions of the drive unit. One end portion of the coil 42b extends axially from the stator core 42a over (radially outside) the taper portion of the outer diameter portion 30a of the front cover 30, and the coil 42b is radially coextensive with the largest diameter portion of the outer diameter portion 30a. Specifically, the transmission unit 5 with the motor/generator 6 is able to be arranged with a radial dimension substantially the same as and an axial dimension only slightly larger than those dimensions of the conventional torque housing 12.

Operation of the hybrid vehicle drive train 1 will now be described. With the vehicle stopped and the ignition switch ON, when the driver depresses the accelerator pedal (with low throttle opening) to start the vehicle in motion, current first flows from the battery (not shown) to the motor/generator 6 which functions as a motor. The motor/generator 6, a brushless DC motor, adjusts the timing of the current flowing to the coil 42b of the stator 42 with a controller (not shown) based on correct detection of the position of the rotor 43 by the resolver 46, and rotates the rotor 43 in a forward direction with high efficiency. The rotation of the rotor 43 is transmitted to the center shaft 31 by the friction force between the input plate 50 of the hub 49 and the center shaft flange portion 31c by the rotor support plate 45, the rotor hub 49, as tightened together by the nut 59. Furthermore, the rotation of the rotor 43 is transmitted to the input shaft 10, in accordance with increase in a predetermined torque ratio, via the torque converter 5 which is composed of the front cover 30, the pump impeller 17, the turbine runner 16, and the stator 19.

When the vehicle starts in motion the fuel injection system is stopped and the engine is off. Specifically, the crankshaft 52, via the input plates 50, 51 and the drive plate 55, rotatably drives the rotor hub 49. The engine slips with the pistons only compressing and releasing air in the cylinder chambers. That is, during vehicle starting, the further torque ratio increase of the torque converter 5 combines with the high torque ratio in the first speed of the automatic transmission unit, the latter being based on drive characteristics of the brushless DC motor 6 which outputs high torque at low speeds. As a result, the vehicle starts in motion and runs smoothly at a predetermined torque.

Then, with the vehicle moving at a relatively low predetermined speed immediately after starting, the fuel injection system activates when the throttle is depressed to an extent equal to or greater than a set opening. Ignition is by a spark plug and the motor/generator 6 functions as a starter motor to start the internal combustion engine. As a result, the rotation of the crankshaft 52 of the internal combustion engine is transferred through the center shaft 31 to the drive plate 55, the input plate 51, the hub 50, the lead splines 31a, and the straight tooth splines 50a. In this state, the driving force of the internal combustion engine and the driving force of the motor/generator 6 functioning as a motor are combined and transmitted to the torque converter. Furthermore, the automatic transmission unit 2 up-shifts, transmitting the driving force to the driving wheels at the desired speed. Thus, when a large amount of driving force is required for accelerating the vehicle or climbing hills, the driving force of the motor/generator 6 assists the driving force of the internal combustion engine, running the vehicle with high horsepower.

Then, when the vehicle is constantly running at high speed, the motor/generator 6 is operated under no load (the motor output is controlled so as to cancel out torque generated from reverse power generated by the motor) such that the motor/generator slips and the vehicle runs under power of the internal combustion engine only. Depending on the state of charge (SOC) of the battery, the motor/generator 6 can function as a generator to regenerate energy. When driving with the internal combustion engine or when the internal combustion engine is assisted by the motor, the piston plate 40 moves according to a change in the direction of the converter pressure so as to engage the lock-up clutch 3. Accordingly, the torque transmitted to the front cover 30 is then transmitted directly to the input shaft 10 via the drum 32, the outer friction plates 37, the inner friction plates 36, the hub 35, the damper 41, and the turbine hub 20, by-passing the hydraulic connection through the torque converter.

At this time, as mentioned above, although the size of the lock-up clutch 3 may be minimized by the arrangement of the motor/generator 6, because it is a multiple disc clutch it has sufficient torque capacity to provide the necessary horsepower according to the motor assist. Therefore, the driving forces of both the internal combustion engine and the motor are properly transmitted to the input shaft 10. Also, the lock-up clutch 3 composed of the multiple disc clutch, combined with the piston plate 40, enables slip control such that the lock-up clutch 3 is able to be operated with slip at many shifting speeds.

When there is excess output from the internal engine because of constant low speed or downhill running or the like, the motor/generator 6 functions as a generator and charges the battery by switching the coil 42b of the stator 42 to a charging circuit and controlling the OFF time of a chopper switch and the like. Specifically, when the engine brake operates during downhill running, the regenerated power from the motor/generator 6 which is functioning as a generator increases so that a sufficient braking effect is provided. Also, when the driver depresses the foot brake to stop the vehicle, the regenerated power from the motor/generator 6 further increases, and the motor/generator 6 operates as a regenerative brake, regenerating the inertia energy of the vehicle as power and decreasing the energy dissipation as heat by the friction brake.

Then, when the vehicle is stopped at a traffic light or the like, both the motor/generator 6 and the internal combustion engine turn off, i.e., the idling of the conventional engine is eliminated. Also, when the vehicle takes off from a standstill, power is initially provided only by the motor driving mode of the motor/generator 6. Immediately thereafter, while at a relatively low speed, the engine is started by the motor driving power. Assist from the driving power of the motor 6 eliminates need for sudden fluctuations in driving force of the engine, thereby making operation smooth. Then, when engine braking is necessary or when braking to a stop, the motor/generator 6 functions as a regenerative brake, regenerating vehicle inertia energy as electrical energy. With this combination, the present hybrid vehicle is able to achieve low fuel consumption and a decrease in exhaust gas.

In the internal combustion engine, the pistons are reciprocated by the force of explosion (combustion) within the cylinder chamber, thus rotating the crankshaft and transmitting driving power. As a result, eccentric rotation of the crankshaft 52 is caused by the explosion vibrations which inevitably wears the shaft core. Meanwhile, the motor/generator 6 is arranged within the motor housing 15 located in between the engine housing 13 and the converter housing 12. The rotor 43 of the motor/generator 6 is supported by the motor housing 15 via the bearing 47. Specifically, the flanged portion 49a of the support plate hub 49 which supports the permanent magnet laminated plates 43a of the rotor 43 fits and is supported with a high degree of tolerance on the inner race of the ball bearing 47. The outer race of bearing 47 is connected to the housing side wall 15a.

The crankshaft 52 and the rotor hub 49 are connected via the input plate 51 and the drive plate 55. The eccentric rotation due to explosion vibrations of the crankshaft 52 is eliminated by the flexing of the drive plate 55 and the input plate 51 (flex plates), without being transmitted to the rotor hub 15. In addition, since the crankshaft 52 and the center shaft 31 are axially separated and not directly connected to one another, there is no affect on the independent and highly precise rotational support of the rotor 43. The stator 42 is directly fixed to the motor housing 15 in exact opposition to the rotor 43 with a slight gap therebetween. There is little radial load on the ball bearing 47 because the vibrations caused by the ignitions/combustions are absorbed by the two plates 51, 55 and the ball bearing 47 is independently supported by the motor housing side wall 15a.

The torque converter 5 deforms by expanding and contracting due to the change of internal pressure, i.e., the charge pressure supplied to the converter compartment B formed by the front cover 30 and outer shell of the pump impeller 17 of the torque converter 5 and the centrifugal pressure generated by rotation thereof. However, the front cover 30 and the rotor support plate 45 are each of separate, independent constructions so that the deformation of the torque converter 5 does not affect the highly precise centering of the rotational support of the rotor 43. In addition, the front cover 30 is composed of a solid, one-piece construction wherein the center portion 30b thereof extends in steps in the axial direction and the front cover inner circumference is fixed to the center shaft flange portion 31c and is axially supported by the bearing 47 via the rotor hub 49 and the nut 59, so that the deformation of the torque converter due to changes the charge pressure and/or the centrifugal pressure is directed only toward the rear where it is absorbed by the support portion of the oil pump 22a, without forcing the front cover 30 forward and affecting the rotor support plate 45.

As a result, the motor/generator 6 is precisely supported both axially and radially and is located radially outward of the lock-up clutch 3 which has been reduced in size relative to a conventional lock-up clutch. The motor/generator 6 does not protrude much beyond the outer diameter of the torus of the torque converter 5. High efficiency and high output are achieved with the motor/generator 6 despite the compact construction thereof.

Even if the vibrations in the crankshaft 52 are transmitted as minute vibrations to the plate hub 50 via the drive plate 55 and the input plate 51, torque is still able to be transmitted without fretting wear because the straight tooth splines 50a of the hub 50 and the helical splines 31a of the center shaft 31 are press-fit together and integrally rotate with no play therebetween. Also, the rotor hub 49, which is interposed between the plate hub 50 and the center shaft flange portion 31c with the nut 59 tightened, integrally rotates by frictional force therebetween with no play, thereby allowing torque to be transmitted without fretting wear between the center shaft 31 and the rotor hub 49.

Figure 4:
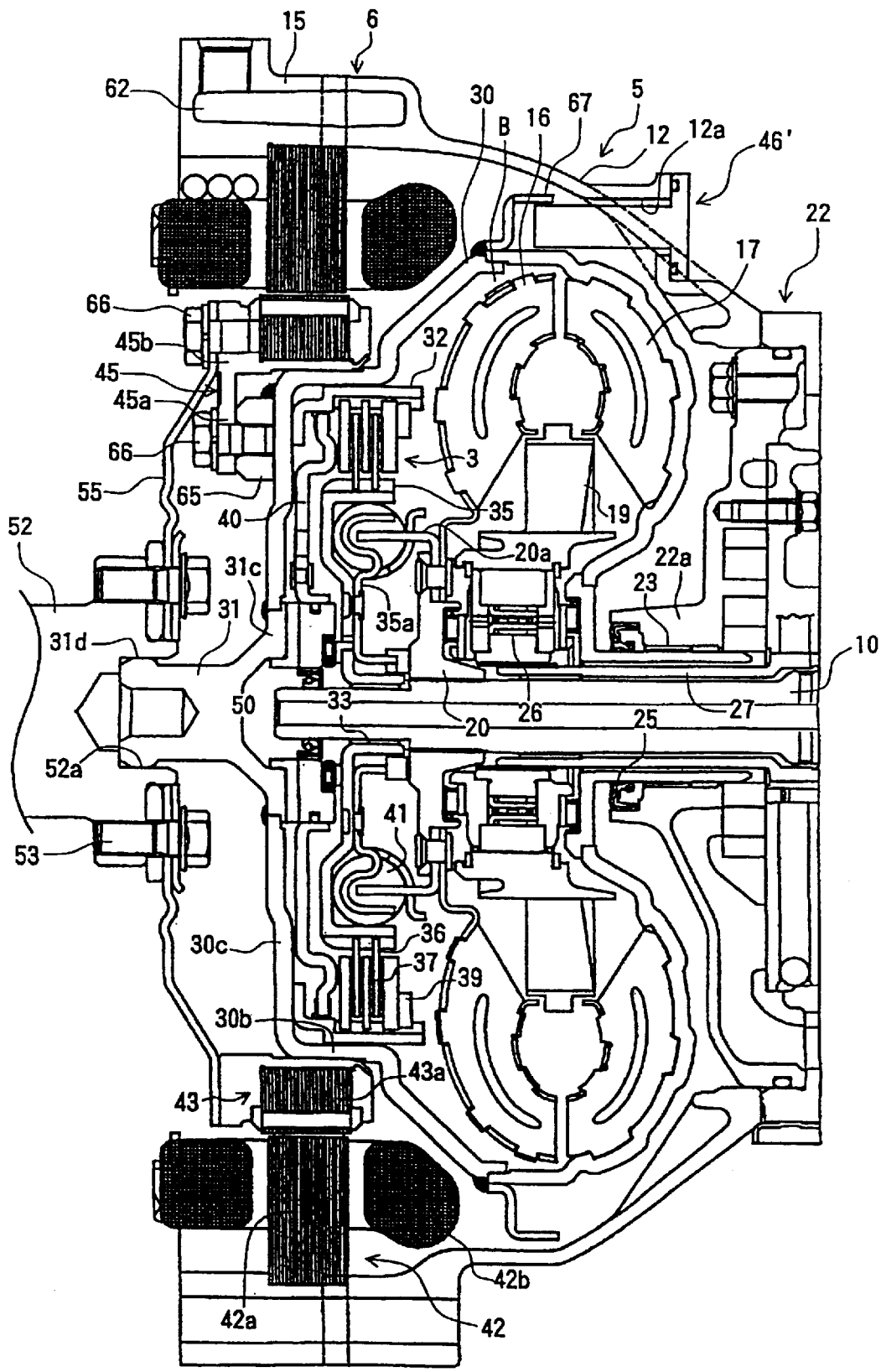
FIG. 4 is a cross-sectional view similar to FIG. 2 and showing a modification of the embodiment of FIG. 1.

Another embodiment (partially modified) will now be described with reference to FIG. 4. The hybrid vehicle drive train according to this embodiment has the rotor 43 of the motor/generator 6 directly supported by the front cover 30. The description thereof is omitted because the same reference numerals are used for components and features identical to those in the previously described embodiment.

In the motor/generator 6 according to this second preferred embodiment, the stator 42 thereof is fixed to the motor housing 15 and the rotor 43 is fitted with and arranged on the outer peripheral surface of the central, axially extending portion 30b of the front cover 30. Specifically, the inner peripheral surface of the retention portion (axially extending portion) 45b which retains the permanent magnet laminated plates 43a of the rotor 43 is fitted on and supported by the front cover central portion 30b Further, the disc portion 45a of the support plate 45 is fixed by a nut 65 to the outside surface of the front cover inner diameter portion 30c via a bolt 66.

As in the previous embodiment, the lock-up clutch 3 has a diameter smaller than that of the torus of the torque converter 5 and is arranged at the inner circumferential surface of the front cover center portion 30b. Therefore, the lock-up clutch 3 and the motor/generator 6 are positioned so as to be radially aligned, i.e., they are overlapping in the axial direction. In addition, as in the previous embodiment, the damper 41 of the lock-up clutch is arranged at the inner circumferential surface of the hub 35 of the lock-up clutch so as to be radially aligned with the clutch. Therefore, the successive alignment in the radial direction (overlapping in the axial direction) from the casing inward toward the center is: the stator 42 and the rotor 43 of the motor/generator 6, the friction plates 36, 37 of the lock-up clutch 3, and the damper 41.

In this second embodiment, the drive plate 55 is fixed to the tip of the crankshaft 52 via bolts 53 and the tip of the drive plate is fixed to the retention portion 45b of the rotor support plate by bolts 70. The center shaft 31 fixed to the center portion of the front cover 30 protrudes forward with the tip portion 31d thereof extending within a center hole 52a of the crankshaft 52, with alignment identical to that of a conventional automatic transmission.

A through hole 12a extends axially through the torque converter housing 12. A rotational displacement sensor 46' is mounted in hole 12a. This sensor is able to detect the rotational position of the front cover 30 and therefore the rotational position of the rotor 43 integrated therewith, within the rotary disc 67 fixed to the front cover 30.

In this second embodiment, the rotor is not independently rotatably supported as in the previously described embodiment, so the precision of centering of the rotor is reduced. However, the bearing, the support plate, and the hub and the like which support the rotor are unnecessary, enabling that much more compactness in the axial direction. The description of its operation will be omitted because it is identical to that of the previous embodiment.

In the foregoing embodiment, a 5-speed automatic transmission unit is illustrated as the automatic transmission unit. However, the present invention is not limited to such a 5-speed transmission and may also be applied to other automatic transmission units such as 4-speed and 3-speed automatic transmission units. Further, application is not limited to use with only FR type vehicles but can also be used with FF (front engine/front wheel drive) type vehicles. Also, while in the foregoing embodiment a brushless DC motor is used as the motor/generator, other types of motors such as a DC motor or an induction-type AC motor or the like may also be used. Moreover, while the foregoing embodiments have been described as having a torque converter, a fluid coupling may be used instead.

In operation of the second embodiment, as the vehicle starts in motion, the motor/generator 6 functions as a motor. The driving force from the motor is transmitted to the vehicle via the torque converter 5 and the automatic transmission unit 2. At this time, the fuel injection system and the like is not activated and the internal combustion engine 13 is in a slip mode. Then, relatively early on after the vehicle has started to move, the fuel injection system activates and the motor/generator 6 functions as a starter motor to start the engine. In this state, the driving force of the motor/generator 6 assists the driving force of the internal combustion engine, providing the required horsepower for acceleration, hill climbing and the like. Then, when the running speed becomes constant, the motor/generator 6 either slips or functions as a generator with the vehicle run by the power of the internal combustion engine alone. Also, when running down-hill, the motor/generator functions as a generator, increasing the engine brake effect. Further, when braking, regenerative power from the generator is further increased and the motor/generator 6 functions as a regenerative brake. Then, when the vehicle is stopped, the internal combustion engine shuts off, thus eliminating the idling state.

The driving force of the internal combustion engine and/or that of the motor/generator is directly transmitted to the input shaft 10 of the automatic transmission unit by the engagement of the lock-up clutch 3 without passing through the torque converter 5. While the lock-up clutch 3 is constructed with a small diameter because the motor/generator 6 is provided radially outward thereof, because the lock-up clutch 3 is a multiple disc clutch it has a sufficient torque capacity corresponding to the driving force.

Because the rotor 43 of the motor/generator 6 is independently supported via the bearing 47 in the motor housing 15, 15a it is not affected by either the eccentric rotations caused by vibration of the crankshaft 52 or deformation from the operating pressure and centrifugal force of the hydraulic transmission.

While the foregoing description of preferred embodiments is directed to a drive train intended for use in a hybrid vehicle wherein the motor/generator 6 is employed to drive the vehicle, the invention is not so limited. The invention, for example, is also applicable to a vehicle wherein the drive wheels are powered by the engine alone and the motor/generator 6 is operated in a motor mode only for the purpose of starting the engine.

Japanese Application Serial No. 11-084924 filed Mar. 26, 1999 and Japanese Application Serial No. 11-104540 filed Apr. 12, 1999, inclusive of their specifications, claims and drawings are incorporated by reference herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle drive train for powering a vehicle comprising:
an engine having a crankshaft;
a first transmission unit having an input shaft;
a second transmission unit interposed between the crankshaft and the input shaft of said first transmission unit;
a lock-up clutch; and
a motor having a stator and a rotor, said rotor being directly connected to an output element of said engine; wherein:
said lock-up clutch is located axially intermediate said engine and said second transmission unit and has a diameter smaller than the largest diameter of said second transmission unit;
said motor axially overlaps an outer circumferential surface of said lock-up clutch; and
said stator has an inner diameter smaller than the largest diameter of said second transmission unit.

2. The vehicle drive train according to claim 1, wherein said lock-up clutch is a multiple disc clutch.

3. The vehicle drive train according to claim 2, wherein:
said lock-up clutch has a damper with circumferentially spaced coil springs; and
said damper is mounted axially overlapping the inner circumferential surface of friction plates of said lock-up clutch.

4. The vehicle drive train according to claim 1 wherein:
said second transmission unit is a hydraulic transmission having the shape of a torus and including a pump impeller, a turbine runner and a front cover which covers said turbine runner and said lock-up clutch, said front cover connecting said pump impeller, said crankshaft, and said rotor;
said front cover has an axially extending center portion;
said motor is arranged radially outward of said center portion; and
said lock-up clutch has a diameter smaller than the outside diameter of said torus and is arranged radially aligned with and radially inward of said center portion.

5. The vehicle drive train according to claim 1 further comprising:
a sensor for detecting a rotational position of said rotor, said sensor being arranged substantially axially aligned with said lock-up clutch and radially inward of said stator.

6. The vehicle drive train according to claim 1 further comprising:
a transmission housing covering said second transmission unit and said lock-up clutch; and
a motor housing, said stator being fixed to said motor housing, and said motor housing being arranged between said second transmission housing and said engine.

7. The vehicle drive train according to claim 4, wherein said rotor is directly connected to said front cover for rotation therewith in forward and reverse directions.

8. The vehicle drive train according to claim 1 wherein said second transmission unit is a torque converter in the shape of a torus and which includes a turbine runner, a pump impeller, and a stator and wherein said lock-up clutch has a diameter smaller than the outside diameter of the torus.

9. The vehicle drive train according to claim 1 wherein said motor is a motor/generator which has a motor operating mode and a generator operating mode.

10. The vehicle drive train according to claim 1 wherein said first transmission unit is an automatic transmission.

11. The vehicle drive train according to claim 1 wherein said motor is a motor/generator which has a generator operating mode and a motor operating mode in which said motor powers the vehicle, whereby the vehicle is a hybrid vehicle.

12. The vehicle drive train according to claim 1 wherein:
said second transmission unit comprises a front cover covering a turbine runner and said lock-up clutch and connecting a pump impeller to said motor and said output element of said engine;
said front cover comprises an outer diameter portion covering said turbine runner and a center portion having a smaller diameter than a largest diameter portion of said outer diameter portion;
said center portion of the front cover covering said lock-up clutch;
said outer diameter portion having a taper portion connecting the largest diameter portion of the outer diameter portion to said center portion;
said rotor is disposed so that the inner diameter of the rotor is larger than the diameter of said center portion of the front cover and the outer diameter of the rotor is smaller than the diameter of said largest diameter portion of the outer diameter portion of the front cover;
said stator comprises a stator core and a coil, said coil comprises a coil end portion axially extending from said stator core, said stator core is disposed so as to axially overlap with said rotor and so that the inner diameter of the stator core is larger than the diameter of said rotor and smaller than the diameter of said large diameter portion of said front cover, said coil end portion is disposed so that at least a portion of said coil end portion is positioned radially over said taper portion of said outer diameter portion of said front cover and is radially coextensive with said largest diameter portion of said outer diameter portion.

13. A vehicle drive train comprising:

an engine;

a hydraulic transmission including a pump impeller, a turbine runner and a front cover integrally connected to an outer shell of said pump impeller and covering said turbine runner;

a motor including a stator and a rotor and being disposed between said transmission unit and said engine, said rotor being connected to an output element of said engine;

a center shaft integrally connected to said front cover;

a support member rotatable supporting said rotor, said support member having a hub fitted on said center shaft; and a nut which screws onto threads formed on said center shaft so as to press the hub of the support member against said front cover for rotation therewith.

14. The vehicle drive train according to claim 13:

wherein said transmission unit is a hydraulic transmission including a pump impeller, a turbine runner, a lock-up clutch and a front cover which is integrally connected to an outer shell of said pump impeller, said front cover covering said turbine runner and said lock-up clutch, and wherein said vehicle drive train further comprises support members for supporting the rotor independently of said front cover on an engine side thereof and bearings mounted in said motor housing, interposed between said support members.

15. The vehicle drive train according to claim 14, wherein:

said motor housing has a side wall which separates said engine from said motor; and said bearings are installed in an inner circumference of said side wall.

16. The vehicle drive train according to claim 13:

wherein said center shaft is axially aligned with a crankshaft of said engine and has an end opposing an end of the crankshaft with a gap therebetween, said center shaft and the crankshaft being connected by impact cushioning members.

17. The vehicle drive train according to claim 16, further comprising:

a plate hub connected to said crankshaft through said impact cushioning members, said plate hub forming a spline-couple with said center shaft, said spline couple being a press-fit between a helical spline and straight splines.

18. The vehicle drive train according to claim 16, wherein said impact cushioning members comprise two flexible plates.

19. The vehicle drive train according to claim 17, wherein said impact cushioning members comprise two flexible plates.

20. The vehicle drive train according to claim 13 wherein:

said motor is a motor/generator which has both a motor operational mode and a generator operational mode.

21. The vehicle drive train according to claim 13 additionally comprising an automatic transmission.

22. The vehicle drive train according to claim 21 wherein said automatic transmission is axially aligned with said hydraulic transmission, said rotor and said engine and wherein said hydraulic transmission is axially intermediate said automatic transmission and said rotor.

23. The vehicle drive train according to claim 13 wherein said motor is a motor/generator which has a generator operating mode and a motor operating mode in which said motor powers a vehicle, whereby the vehicle is a hybrid vehicle.

24. A vehicle drive train comprising:

an engine;

a transmission connected to said engine;

a motor having a stator and a rotor, said rotor being directly connected to an output element of said engine; wherein:

said transmission has a small diameter portion and a large diameter portion having a diameter larger than said small diameter portion, said small diameter portion and said engine;

said motor axially overlaps an outer circumferential surface of said small diameter portion; and said stator has an inner diameter smaller than the largest diameter of said second transmission unit.

25. A vehicle drive train comprising:

an engine;

a hydraulic transmission including a pump impeller, turbine runner and a front cover integrally connected to an outer shell of said pump impeller and covering said turbine runner;

a motor including a stator and a rotor, said rotor being connected to an output element of said engine;

a transmission housing enclosing said hydraulic transmission;

a motor housing for said motor provided between said transmission housing and said engine, said stator being fixed to said motor housing and said rotor being rotatably supported by said motor housing;

a center shaft integrally connected to said front cover;

a support member rotatably supporting said rotor, said support member having a hub fitted on said center shaft; and a nut which screws onto threads formed on said center shaft so as to press the hub of the support member against said front cover for rotation therewith.

\* \* \* \* \*

UNITED STATES PATENT AND TRADEMARK OFFICE
CERTIFICATE OF CORRECTION

PATENT NO. : 6,258,001 B1
DATED : July 10, 2001
INVENTOR(S) : Wakuta et al.

It is certified that error appears in the above-identified patent and that said Letters Patent is hereby corrected as shown below:

Column 15,
Line 23, "rotatable" should read -- rotatably --.

Column 16,
Line 32, after "portion" insert -- being located axially intermediate said large diameter portion --.

Signed and Sealed this

Third Day of September, 2002

*Attest:*

*Attesting Officer*

JAMES E. ROGAN
*Director of the United States Patent and Trademark Office*